United States Patent [19]

Hymes

[11] 3,897,577

[45] July 29, 1975

[54] DRY PARTICULATE BLEND CONTAINING BINDER/DISPERSION AID COMPONENT COMPRISING CELLULOSIC AND VINYL ACETATE AND/OR ALCOHOL MATERIALS AND METHOD OF USING THE BLEND IN A ROLL-ON TEXTURE COMPOSITION

[76] Inventor: Richard H. Hymes, 7416 W. Shore Dr., Minneapolis, Minn. 55435

[22] Filed: Apr. 19, 1974

[21] Appl. No.: 462,507

[52] U.S. Cl.............. 427/277; 260/17; 260/2.5 B; 427/368; 427/428
[51] Int. Cl.² ...................... B44C 1/20; C08L 1/26
[58] Field of Search 260/29.6 WA, 29.6 PS, 29.6 R, 260/29.6 S, 2.5 B; 117/8, 9, 10, 111 R, 111 C, 62, 161 C

[56] References Cited
UNITED STATES PATENTS

| | | | |
|---|---|---|---|
| 2,990,382 | 6/1961 | Wagner et al. | 260/17 |
| 3,197,428 | 7/1965 | Siegele | 260/29.6 |
| 3,239,475 | 3/1966 | Clark | 260/17 |
| 3,342,761 | 9/1967 | Wilkinson et al. | 260/17.4 |
| 3,399,158 | 8/1968 | Huitson | 260/29.6 |
| 3,483,156 | 12/1969 | Mills et al. | 260/29.6 |
| 3,578,618 | 5/1971 | Beardsley | 260/17 |

*Primary Examiner*—Melvin Goldstein
*Assistant Examiner*—Edward Woodberry
*Attorney, Agent, or Firm*—Thomas M. Meshbesher

[57] ABSTRACT

The disclosed dry powder blend can be mixed in a 0.5 – 3:1 ratio (weight/weight) of water-to-blend to provide a syrupy coating composition which can be coated onto walls and ceilings with a conventional paint roller to provide a textured surface. The dry powder blend should contain a particular binder/dispersion aid component, whereby the blend comprises 1 – 7 wt.% water dispersible vinyl acetate and/or vinyl alcohol polymer (e.g. 1.5 – 4 wt.%) and 0.5 – 4 wt.% (e.g. 1 – 3 wt.%) methyl cellulose. This component helps to provide the needed pot-life, non-running, non-sagging, and non-streaking properties for proper application with the paint roller.

11 Claims, No Drawings

DRY PARTICULATE BLEND CONTAINING BINDER/DISPERSION AID COMPONENT COMPRISING CELLULOSIC AND VINYL ACETATE AND/OR ALCOHOL MATERIALS AND METHOD OF USING THE BLEND IN A ROLL-ON TEXTURE COMPOSITION

FIELD OF THE INVENTION

This invention relates to dry powder blend suitable for mixing with water to form a textured coating composition which can be applied to a wall or ceiling with a conventional paint roller. To provide the textured appearance, the dry powder blend contains a relatively coarse filler material, e.g. a filler material which, for the most part, would be retained on a 40 U.S. mesh screen. An aspect of this invention relates to a method for applying the composition to a wall, ceiling, or the like which involves mixing the dry powder blend with water to obtain a paste-like, textured coating composition capable of being applied to a surface with a conventional paint roller without significant sagging or streaking (i.e. uneven application) problems.

DESCRIPTION OF THE PRIOR ART

As even a brief review of the available trade literature would show, there are a wide variety of coating compositions available for both the professional and the do-it-yourself artisan seeking to avoid the trouble and expense of working with the traditional wall and ceiling and exterior finishing materials, e.g. such traditional materials as wet plaster, stucco, and the like. Cement block fillers and coating agents, particularly in liquid form, are available for spray-on application. Dry powder joint cement compounds can be mixed with water and applied with a trowel or the like. A multitude of so-called wall and ceiling texture compositions are available also. These compositions contain a relatively coarse aggregate or filler material roughly equivalent in particle size to ordinary silica sand (e.g. the type of silica sand used in the manufacture of concrete). Due to its high weight, the appearance of silica sand is typically simulated with expanded or intumesced or vitreous materials such as expanded perlite, vermiculite, and the like. A dry powder texturing material could be mixed with water and applied to a surface with a trowel, but it ordinarily would not have the properties needed for application with a conventional paint roller. A more common approach for providing the textured and/or stucco appearance to a wall or a ceiling is to either spray on the texture material or to formulate the texture material as a true paint.

The spray application of a textured paint material or the like ordinarily requires professional competence. Typically, any objects in the area which are not to be coated are covered up or taped. Accordingly, it is most efficient to apply the textured material in a newly constructed area where there are no rugs, furniture, drapes, or the like. A dry powder blend which could be mixed with water and applied with a paint roller would be most desirable. However, it is difficult to formulate such a dry powder blend without running the risk that the paste-like composition obtained after admixture with water will either sag or run, on the one hand, or, on the other hand, form streaks or other effects from uneven application due to excessive viscosity or the like.

A representative sampling of the prior art in this field can be obtained by consulting the trade literature available from such companies as Airco Chemical, Johns-Manville, Dow Chemical Company, Colloids, Inc. (Newark, N.J.), Thompson-Weinman and Co., Colton Company, Air Reduction Chemical and Carbide Company, Air Products and Chemicals, Inc., etc. Of particular interest is the trade literature regarding "Vinac" resins (trademark), "Vinol" resins (trademark), "Micro-Cel" (trademark), "Methocel" (trademark), "Snobrite" (trademark), "Celite" (trademark), "Flexbond" (trademark), and the like.

SUMMARY OF THE INVENTION

It has been discovered that a dry powder blend can be prepared which is suitable for mixing with water to form a paste-like, roll-on wall or ceiling texture coating composition containing the usual sand filler or (preferably) imitation sand filler and a high proportion of pigment by selecting an appropriate binder/water-dispersion-aid/thickener composition. The composition which results after mixing the dry powder blend with 0.5 – 3 parts of water by weight, per part by weight of the dry powder blend has surprising "hold out", workability, pot life, and roll-on properties. (The optimum ratio is 1.0 to 1.1 parts by weight of water per part by weight of dry blend.) This paste-like or syrupy coating composition can be applied with a conventional paint roller with little or no sagging or running or streaking from uneven application. When applied with sufficient thickness (e.g. 10 – 15 square feet per pound of dry blend), the hold out properties are sufficient to bridge large cracks and imperfections in a wall or ceiling surface, eliminating the need for elaborate preparation of the surface prior to roll-on application. The pot life is long enough to allow working with the material in various ways, even after application to the wall or ceiling surface, yet the pot life is not so long as to interfere with subsequent operations, e.g. moving back furniture, subsequent painting operations, and the like. The workability of the material prior to its final set on the wall or ceiling surface permits various effects to be achieved with a trowel or putty knife, e.g. appearance of an exterior stucco wall.

These advantages appear to derive from the binder/water dispersion aid (or thickener) component of the dry powder blend. This component comprises (based on the weight of the total dry blend):

1 – 7% by weight of a powdered, water dispersable vinyl polymer containing at least some vinyl acetate units, and 0.5 – 4% by weight of powdered etherified cellulose.

DETAILED DESCRIPTION

The major components of a composition of this invention include a binder/dispersion aid system (which also has thickening properties), a pigment system (which can include a hydraulic cement), and the coarse filler or aggregate (e.g. simulated sand), which provides the texture. It is preferred to also include auxiliary thickeners and water conditioning agents, which probably work in combination with the binder/dispersion aid system, and one or more fibrous or acicular materials to impart crack resistance and crazing resistance to applied coatings of the material. As will be apparent from the foregoing discussion, all of the components of compositions of this invention can comprise conventional materials well known for use in dry powder blends, paints, and other coating compositions. Accordingly, the skilled artisan will be able to duplicate or obtain these components based on a rather general description and one or more specific Examples.

BINDER/DISPERSION AID COMPONENT

Although this invention is not bound by any theory, it is believed that this component has provided the path to a solution of the prior art problems in the field of textured coating compositions. This component comprises a combination of a suitable water dispersible vinyl polymer and etherified cellulose, preferably methyl cellulose. As pointed out previously, the vinyl polymer portion of the binder/dispersion aid component makes up 1 – 7% by weight of the total dry blend. This entire range is not equally effective; at least 1%, but no more than about 4% by weight is generally preferred. Optimum results are generally obtained in the range of 1.5 – 3%. For the methyl cellulose portion of the component, 1 – 4% (more typically 1 – 3%) is preferred, though as little as 0.5% can be operative. Both the methyl cellulose and the vinyl polymer are in finely divided form, a typical U.S. Standard Sieve analysis indicating as little as 0% retention on a 40 mesh or even a 60 mesh screen. A substantial or even major amount of −325 mesh particles can be used, e.g. particles in the 1 – 40 micron size range.

As is known in the art, methyl cellulose is available in a variety of grades which are generally classified in terms of water thickening properties. Methocel (trademark of Dow Cehmical Company) has the ability to provide water solutions or dispersions ranging in the viscosity from 15 centipoise (cps) to 4,000 cps or more at room temperature, even at Methocel concentrations of less than 5 weight %, e.g. 0.2 – 3%.

The water dispersible vinyl polymer should contain at least some vinyl acetate units. Up to 99% or more (e.g. up to 99.8%) of these units can be hydrolyzed to polyvinyl alcohol units, if desired. Thus, the vinyl polymers used in this invention can be essentially homopolymers (polyvinyl alcohol or polyvinyl acetate) or copolymers, most conveniently obtained by partially hydrolyzing polyvinyl acetate to obtain 1 – 99.8% (on a molar or weight basis) of polyvinyl alcohol. As is known in the art, vinyl acetate and vinyl alcohol polymers (including copolymers) can contain other monomeric units (e.g. vinyl chloride, methyl vinyl ether, maleic anhydride, etc.) and still have water compatability.

All vinyl acetate or partially or fully hydrolyzed vinyl acetate polymers do not work with equal effectiveness, and mixtures of vinyl acetate polymers with partially hydrolyzed vinyl acetate polymers are generally the most efficient in the context of this invention. For example, 100 parts by weight of a 90 – 99+% hydrolyzed polyvinyl acetate mixed with 50 – 100 parts per 100 (phr) of a relatively non-hydrolyzed polyvinyl acetate powder is more efficient than 200 parts by weight of the relatively non-hydrolyzed polymer alone. Among the suitable commercial embodiments of vinyl alcohol and/or vinyl acetate polymers are the VINAC and Vinol powders obtainable from Airco Chemical (Air Reduction Chemical and Carbide Company).

Although the ratio of vinyl polymer to methyl cellulose can, according to the principles of this invention, theoretically vary from 14:1 to 1:4, it is preferred that this ratio range from about 4:1 to about 1:3, more typically 2:1 to 1:1 (by weight).

AUXILIARY THICKENERS AND WATER CONDITIONERS

It is generally useful in compositions of this invention to include alkali metal phosphate (including condensed polyphosphates such as sodium or potassium tripolyphosphate), wetting agents, inorganic thickeners (e.g. clays and treated clays), protective colloids, defoaming agents, and the like. Some or all of these ingredients are believed to assist the vinyl polymer and the methyl cellulose in their water dispersing and pigment binding functions. The total amount of the entire auxiliary thickener/water-conditioning component need not exceed 5% by weight of the total dry blend, and about 2% by weight or less is more typical. In one preferred embodiment of this invention, the major amount of the auxiliary thickener/water-conditioning component comprises sodium or potassium phosphate, which is typically combined with an almost equal amount of a clay such as bentonite. Protective colloids, wetting agents, defoamers, and the like, when used, typically comprise less than 1% of the total composition, even in combination.

FIBROUS OR ACICULAR COMPONENT

Another optional but preferred component comprises discontinuous fibers or acicular particles ranging from several microns up to about 15mm in length. The preferred fibers are inorganic, e.g. glass fiber or one or more fibers from the asbestos group. These long, thin particles impart cracking resistance and craze resistance to coatings obtained from a composition of this invention. The total amount of the fibrous component need not exceed 15% or even 10% by weight of the total composition, and 5% by weight or less is more typical.

PIGMENT OR PIGMENT/CEMENT COMPONENT

Any of the conventional paint pigments, both white and colored (e.g. brown, red, etc.) can be used in this invention. Inorganic pigments with good hiding power are preferred, e.g. titanium dioxide, synthetic calcium silicate, precipitated calcium carbonate, lamellar clay or clay platelets (e.g. of the kaolin type), barium sulfate, hydrated alumina, etc. Although the total pigment system can comprise at least 10% and up to 80 or even 90% by weight of the total composition, the amount of fine pigment (e.g. pigment particles smaller than two microns) can be limited to a relatively small amount of the composition through the use of pigment extenders such as ground calcium carbonate. Ground calcium carbonate (as opposed to precipitated calcium carbonate) typically comprises at least 60% by weight of particles larger than 2 microns equivalent spherical diameter (esd) as determined by settling techniques. The average particle size of ground calcium carbonate can be in the range of 2 – 20 microns (e.g. 10 – 15 microns), and calcium carbonate ground in a roller mill can have a particle size ranging up to 150 microns or more. Particulate kaolin, both in the form of platelets and stacked platelets, is also available in particle sizes larger than 2 microns. For maximum whiteness, Kaolin with a particle size of at least 60 wt.% finer than 2 microns (esd) is preferred. From 10 to 80% by weight of the composition can comprise an extender pigment having an average particle size larger than 2 microns. For interior use, the amount of extender pigment typically ranges from 50 to 75% by weight.

The preferred fine pigments of this invention include materials such as synthetic calcium silicate, titanium dioxide, hydrated alumina, fine kaolin, precipitated barium sulfate, and the like. It has been found that 5 – 20% (based on the total weight of the composition) of coating grade kaolin (80% or more finer than 2 microns, esd) provide sufficient hiding power, even without titanium dioxide or hydrated alumina, if a small amount of white synthetic calcium silicate (99% –325 mesh) is included in the pigment component. This small amount can be as low as 0.5% and need not exceed 5%, based on the weight of the total dry blend.

To provide a composition which will adequately "set", it is preferred to include up to 40% of a cementitious material, e.g. a hydraulic cement such as white portland cement. The amount of portland cement in the dry blend varies, depending upon the use of the composition. For ceiling texture, 5 – 10% by weight (based on the total dry blend) is ordinarily sufficient. For interior wall texture, less portland cement can be used, e.g. as low as 3% by weight. On the other hand, much larger amounts are preferable for exterior use, e.g. 15 – 40% by weight.

TEXTURE-IMPARTING COMPONENT

Compositions of this invention contain a coarse filler or aggregate or other texture-imparting particulate material which is relatively coarse compared to the pigments and pigment extenders. Even the coarsest of the pigment extenders would not normally be retained on a 40 U.S. mesh screen, but a significant amount (up to 100%) of the texture-imparting material will not pass a 40 mesh screen. This is because the texture-imparting mineral is intended to simulate the appearance of the coarse silica sand used in stucco or the like. In fact, but for its relatively low water demand properties and high density, coarse silica sand would probably be used in many commercially available wall or ceiling texture compositions.

Thus, for all practical purposes, the material (preferably a mineral rather than a comminuted plastic) used to impart a textured appearance to compositions of this invention is generally in the −3+40 U.S. mesh size range, more typically −6 mesh and preferably −8 mesh. To provide a roll-on texturing material which can be coated and then worked or shaped with a trowel, stiff brush, wisk broom, or the like to simulate the surface of brick or wood, a finer filler is preferred, e.g. −12 mesh or even −16 mesh.

The amount of the texture-imparting filler in dry blends of this invention varies considerably depending upon the density of the filler, the desired aesthetic effect, and the like. Regardless of the density of the filler, however, the amount by volume in the dry blend will generally be within the range of 10 to 65%, more typically about 10 to about 40% by volume (e.g. 25 – 35 volume %). The amount by weight of the texture-imparting filler is more difficult to specify, since the true or apparent density of this filler can vary from as little as 0.1 to as high as 2.7 gram per cubic centimeter or more, depending upon the mineral used. To reduce shipping weight, the mineral used preferably has a density less than 0.5 gram/cm$^3$. The expanded or intumesced or vitreous minerals such as expanded perlite, vermiculite, etc. are particularly suitable in this regard. They have a high water demand (which is useful in the context of this invention) and a very low density. To the naked eye, they are very effective in simulating the textured appearance provided by the sand in a stucco composition or the like.

Although it is difficult to specify the amount of texture-imparting filler on a weight basis, a typical weight % range for a low density filler would range from 5 to 20 weight %.

METHODS OF PREPARATION AND APPLICATION

There is no complicated technology involved in preparing dry powder blend of this invention; the materials can be mixed in virtually any order of addition. Simple blending (preferably without any milling or particle size reduction effects) is involved in combining the dry ingredients.

There are several methods for using compositions of this invention. In the case of roll-on ceiling texture compositions, for example, one preferred procedure is as follows:

1. Pour a suitable amount of clean water at room temperature into a clean container.
2. While stirring, slowly add a dry blend of this invention.
3. Mix thoroughly. This should provide a consistency which resembles heavy syrup. When properly mixed, the material will adhere to the roller rather than drip off. There will be a minimum of splattering.
4. To stretch the pot life of the resulting mixture, it may be necessary to reduce thickening at times by adding more water.
5. With a paint roller (⅜ or ½ inch nap), working in small sections (about 4 × 4 feet), wet the wall or ceiling surface with the admixed composition.
6. Roll a heavy second coat over the first before the first coat sets up.
7. Roll out evenly, moving onto the next section before the surface dries. Light pressure on the roller produces a heavier stipple effect. Heavier pressure will tend to eliminate the stipple and produce a finer texture.

The proper amount of water to be used in step (1) varies with the density of the texture-imparting filler. As a general rule, 0.5 – 3 parts of water by weight per part by weight of the dry powder blend, produces the desired paste-like or syrupy mixture. If the texture-imparting filler is of relatively low density, the preferred proportions are 0.9 – 1.2 parts of water per part of dry powder blend (by weight), assuming the water is at a temperature of 20° – 25°C. The optimum mixture appears to be 1.0 to 1.1 parts water per part of dry blend; by volume, this typically works out to 1.75 – 2.5 parts of *blend* per part of *water*, the optimum volume/volume ratio being 2:1 (blend:water).

In addition to simulating sand-filled mortar or plaster materials (e.g. stucco), compositions of this invention can be troweled on or rolled on to a wall or ceiling and then shaped to simulate brick, wood, or other construction materials. For simulating brick, it is typically preferred that the composition contain a colorant. After rolling on, the brick-line appearance can be obtained by working the freshly applied or partially set material with a trowel, putty knife, stiff brush, or the like. To simulate wood, it is typically desirable to paint the applied coating to give it a tan or brown or stained appearance. For both simulating of brick and wood, the texture-imparting filler should be a so-called "medium" or "fine" grade (e.g. −12 mesh) or even −16 mesh). To give the coated surface a rough sawn or wood-like appearance (e.g. the appearance of wood grain, resin canals, etc.) the freshly coated or partially set material can be worked over or shaped with a trowel and then further shaped with stiff bristles, e.g. with a wisk broom. A narrow panel or wooden beam can be simulated by taping around the area that is to be given the wooden appearance. Still another technique is to apply the roll-on texture material to a long, narrow base (e.g. a previously cut strip of paneling or wall board such as "Sheet Rock"), the coating of texture material is shaped as described previously and the color of wood or stained wood is simulated with colored pigment, paint, or the like. The coated base then resembles an exposed portion of a wooden beam.

The following Examples illustrate the principle and practice of this invention.

EXAMPLE 1

Dry Blend for Roll-On Ceiling Texture

The following dry ingredients were blended by simple mixing to provide a 2,426-pound batch of dry powder blend.

| Parts by Wt. (pounds) | Ingredient |
|---|---|
| 30 | Water dispersible polyvinyl acetate powder, 98% −100 mesh (VINAC 251, trademark of Airco) |
| 39 | Water dispersible polyvinyl acetate powder, (VINAC 205 [trademark]) |
| 44.5 | Methyl cellulose (Methocel 65HG, trademark of Dow Chemical Company) |
| 14 | Irisodium phosphate |
| 12 | Bentonite (SPV 200) |
| 6 | Wetting agent powder (Petro, trademark) |
| 6 | De-foaming agent (Colloid 513DD, trademark of Colloids, Inc.) |
| 10 | Chopped glass fiber, ⅛" |
| 65 | Asbestos fiber |
| 10 | Micro-Cell T-38 (trademark of Johns-Manville for 99% −325 mesh white calcium silicate) |
| 10 | Celite 281 (trademark of Johns-Manville for flatting agent/pigment extender |
| 188 | White portland cement |
| 250 | Kaolin clay, pigment grade, 99.85% smaller than 44 microns, 83% smaller than 2 microns (Snobrite clay, trademark of Thompson, Weinman & Co.) |
| 1500 | Calcium carbonate pigment extender, roller mill ground, average particle size 12 microns |
| 240 | Perlite aggregate, medium (−16 U.S. mesh)* |

*32 cubic feet by volume; 4 cubic feet weights 30 lbs.

A syrupy roll-on interior wall texture composition suitable for use over concrete blocks, masonry, plaster, wall board or similar surfaces was prepared from 5 quarts of clean water at room temperature and 10 pounds of the above-described composition. The coverage obtained was 130 sq. ft.

EXAMPLE 2

Interior Wall Texture

This composition was prepared in the same manner with the same ingredients in the same amounts, except as noted below:

| Parts by wt. (pounds) | Ingredients |
|---|---|
| 282 | White portland cement |
| 31 | Vinac 251 |
| 40 | Vinac 205 |
| 210* | Perlite aggregate |

*28 cubic feet

EXAMPLE 3

Exterior Wall Texture

In addition to the usual auxiliary thickeners and water conditioning agents, this dry blend contained the following ingredients and the following amounts:

| Parts by Wt. (pounds) | Ingredients |
|---|---|
| 34 | Vinol 523S (partially hydrolyzed polyvinyl acetate, powdered) |
| 20 | Vinac 251 (see Example 1) |
| 49 | Methocel (see Example 1) |
| 75 | Asbestos fiber |
| 14 | Celite 281 (see Example 1) |
| 658 | White portland cement |
| 900 | Calcium carbonate (ave. part. size 12 microns) |
| 175 | Kaolin (83 wt.% less than 2 microns) |
| 210 | Perlite* |

*28 Cu. Ft.

What is claimed is:

1. A dry particulate blend suitable for mixing with water to form a paste-like, roll-on wall or ceiling texture coating composition, comprising the following dry, intimately admixed particulate materials:

a. about 5 to about 20% by weight of expanded or intumesced or vitreous rock particles, said rock particles being generally within the size range of −3+40 U.S. mesh and having true or apparent density less than 0.5 gram/cm$^3$ and being suitable for providing a textured appearance on the surface of a coating obtained from said coating composition;

b. about 30 to 90% by weight of an inorganic pigment;

c. 1 − 7% by weight of a powdered, water dispersible vinyl acetate polymer containing 1 − 99.8% by weight vinyl alcohol units; and d. 0.5 − 4% by weight of powdered methyl cellulose; the ratio, by weight, of vinyl acetate polymer to methyl cellulose being with the range of 4:1 to 1:3.

2. A dry particulate blend according to claim 1 wherein said ratio of vinyl acetate polymer to methyl cellulose is in the range of 2:1 to 1:1 by weight.

3. A dry particulate blend according to claim 1 which further comprises up to 40% by weight of a hydraulic cement.

4. A dry particulate blend according to claim 1 wherein the amount of said vinyl acetate polymer is 1.5 − 4% by weight, and the amount of said methyl cellulose is 1 − 3% by weight.

5. A dry particulate blend according to claim 4 wherein said inorganic pigment is selected from the group consisting of clay and ground calcium carbonate and mixtures thereof, and wherein said blend further comprises an auxiliary thickener/water conditioning component comprising:

i. an alkali metal phosphate or condensed polyphosphate salt;
ii. bentonite clay; and
iii. a defoaming agent.

6. An exterior wall or ceiling texture composition comprising the dry particulate blend of claim 1, the amount of said blend being 10 – 65% by volume.

7. An exterior wall texture composition according to claim 16 wherein said composition contains 25 – 35% by weight of white portland cement.

8. In a dry particulate blend suitable for mixing with water to form a paste-like coating composition which solidifies upon drying, said composition comprising about 30 to 95% by weight of powdered filler or pigment, up to 15% by weight of fibrous or acicular filler, and a water dispersible binder selected from the group consisting of vinyl acetate polymers, vinyl alcohol polymers and mixtures thereof, the improvement which comprises:

a. the binder and water dispersion aid system comprising:
   i. 0.5 – 4 weight % etherified cellulose powder, and
   ii. 1 – 7 weight % of said binder or a mixture of said binder, both percentages being based upon the weight of the total dry particulate blend, the weight ratio of said binder to said etherified cellulose powder being within the range of 4:1 to 1:3, and b. about 5 to about 20% by weight, corresponding to about 10 to about 65% by volume, of expanded or intumesced or vitreous rock particles, said rock particles being generally within the size range of −3+40 U.S. mesh and having a true or apparent density less than 0.5 gram/cm$^3$ and being suitable for imparting a textured appearance to said paste-like coating composition.

9. A method of applying the composition of claim 1 to a coatable surface, comprising the steps of:

a. mixing the dry powder blend of claim 1 with 0.5 – 3 parts of water by weight, per part by weight of said dry powder blend, until a paste-like, textured coating composition is obtained, and b. applying said textured coating composition to said coatable surface with a conventional paint roller.

10. A method according to claim 9 wherein said dry powder blend contains a colorent for simulating the appearance of brick.

11. A method according to claim 9 wherein the coating resulting from said step (b) is shaped with stiff bristles to simulate the texture of wood.

* * * * *